US006550335B2

United States Patent
Weber et al.

(10) Patent No.: US 6,550,335 B2
(45) Date of Patent: Apr. 22, 2003

(54) DEVICE FOR TESTING INTERNAL PRESSURE OF A GAS RESERVOIR OF AN AIRBAG INFLATOR

(75) Inventors: Dieter Weber, Groom Umstadt (DE); Stefan Wiesbaum, Villingen-Schwenningen (DE)

(73) Assignee: Breed Automotive Technology, Inc., Lakeland, FL (US)

( * ) Notice: Subject to any disclaimer, the term of this patent is extended or adjusted under 35 U.S.C. 154(b) by 0 days.

(21) Appl. No.: 10/134,389

(22) Filed: Apr. 30, 2002

(65) Prior Publication Data

US 2002/0184953 A1 Dec. 12, 2002

(30) Foreign Application Priority Data

Jun. 7, 2001 (DE) .......................................... 101 27 634

(51) Int. Cl.[7] .............................................. G01L 11/00
(52) U.S. Cl. ........................................................ 73/702
(58) Field of Search ................................ 73/49.3, 49.2, 73/52, 702, 706, 749, 759; 280/728 R, 735, 736, 737, 741

(56) References Cited

U.S. PATENT DOCUMENTS

| | | | | |
|---|---|---|---|---|
| 4,862,088 A | * | 8/1989 | Etienne et al. ............... 324/326 |
| 5,035,137 A | * | 7/1991 | Burkard et al. ............. 73/146.5 |
| 5,351,527 A | * | 10/1994 | Blackburn et al. .............. 73/52 |
| 5,591,900 A | * | 1/1997 | Bronowocki et al. .......... 73/52 |
| 5,610,340 A | * | 3/1997 | Carr et al. ..................... 73/718 |
| 5,864,295 A | * | 1/1999 | Jarocha ....................... 340/667 |
| 6,247,725 B1 | | 6/2001 | Moller ........................ 280/737 |

* cited by examiner

*Primary Examiner*—William Oen
(74) *Attorney, Agent, or Firm*—Lonnie Drayer; Jarett Rieger

(57) ABSTRACT

A device for testing the inflation state of an cold gas inflator for an airbag has a gas reservoir that is filled with gas at a high pressure, in particular an inert gas. Oscillations of frequencies varying within a particular frequency range are generated at an exterior surface the filled gas reservoir by an oscillation transmitter and the resonance frequency is measured using an oscillation sensor. A comparator compares the measured resonance frequency with a resonance frequency that was determined at the gas reservoir filled with the volume of gas. The oscillation transmitter and the oscillation sensor are integrated in a unit such that the generation and frequency measuring of the oscillations are carried out at locations on the exterior surface of the gas reservoir that are distanced from one another with respect to a longitudinal axis of the gas reservoir.

3 Claims, 1 Drawing Sheet

DEVICE FOR TESTING INTERNAL PRESSURE OF A GAS RESERVOIR OF AN AIRBAG INFLATOR

FIELD OF THE INVENTION

The invention relates to a device for testing the inflation pressure of a gas reservoir that is filled with a high-pressure gas, in particular an inert gas or an inert gas mixture to be used for inflating an airbag.

DISCUSSION OF THE PRIOR ART

U.S. Pat. No. 4,869,097 teaches measuring of the absolute pressure of a gas, for instance helium, contained in a gas reservoir, in particular a spherical gas reservoir. An ultrasonic generator is placed on the exterior surface of the gas reservoir and ultrasonic waves are generated in a particular frequency range. These waves produce sympathetic oscillations of the gas in the reservoir, which are then measured. With the help of calibration curves, the pressure values of the gas contained in the reservoir are determined from the measured resonance frequencies. Since a significant number of successive measurements are required to obtain the pressure values corresponding to a particular resonance frequency, the known method and the known device for testing the internal pressure of cold gas inflators for airbags, for instance during the inspection of a vehicle, in which the airbag and the cold gas inflators are installed, are not suitable. A cold gas inflator filled with an inert gas, e.g. helium, for the inflation of an airbag installed in a motor vehicle, is known from U.S. Pat. No. 6,247,725.

SUMMARY OF THE INVENTION

There is provided in accordance with the present invention a device for testing the internal pressure of a gas reservoir comprising: an oscillation transmitter that can be placed on the exterior surface of the gas reservoir; an oscillation sensor that can be placed on the exterior surface of the gas reservoir; and evaluation electronics comprising a comparator, connected to the oscillation sensor and a set value transmitter that indicates the resonance frequency measured under a set internal pressure, whereby the comparator compares the resonance frequency measured by the oscillation sensor with the resonance frequency indicated by the set value transmitter, the oscillation transmitter and the oscillation sensor are integrated in a unit such that the generation and frequency measuring of the oscillations are carried out at locations on the exterior surface of the gas reservoir that are distanced from one another with respect to a longitudinal axis of the gas reservoir.

BRIEF DESCRIPTION OF THE DRAWING

The FIGURE is a diagrammatic view of a device for testing the internal pressure of a gas reservoir associated with an airbag and a block connection diagram of the associated evaluation electronics.

DETAILED DESCRIPTION OF THE INVENTION

Figure 1:
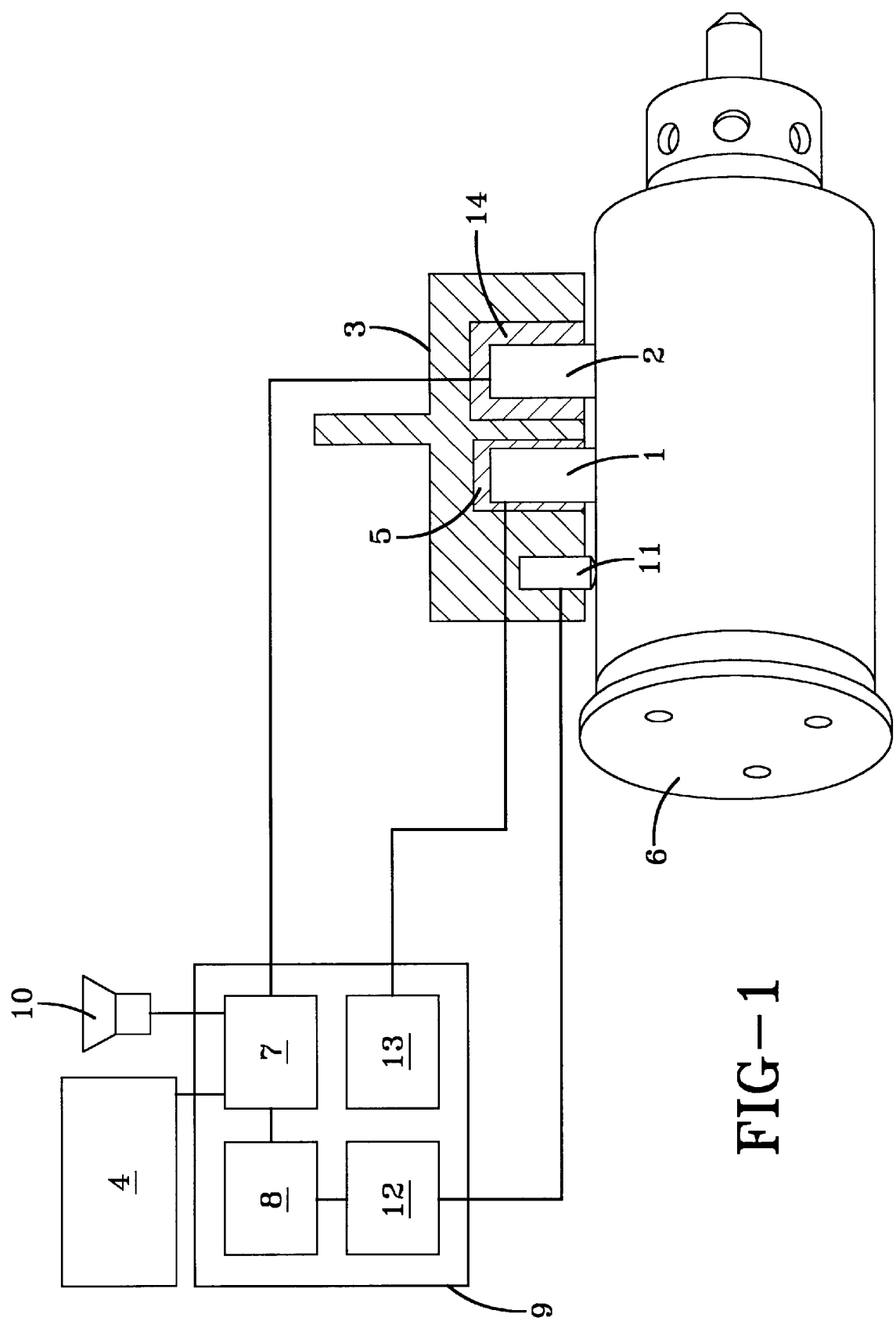

The FIGURE is a diagrammatic view of a device for testing the inflation pressure of an airbag gas reservoir and a block connection diagram of the associated evaluation electronics. A gas reservoir 6 of a cold gas generator is used for inflating an airbag (not further represented) of a motor vehicle. It is understood that the present invention may also be employed with a hybrid inflator. A testing device is foreseen for measuring the inflation pressure of the airbag inflation gas, in particular an inert gas such as helium, argon or a mixture of these, held in readiness and under high pressure in the gas reservoir 6. An oscillation transmitter 1 is connected to a frequency generator 13 for the generation of oscillations in a particular frequency range. In addition, the testing device comprises an oscillation sensor 2, which measures frequencies of the oscillations generated by the oscillation transmitter 1 on the exterior surface of the gas reservoir. The oscillation transmitter 1 and the oscillation sensor 2 are arranged in a unit 3 that forms a measuring head.

With the help of the unit 3 the oscillation transmitter and the oscillation sensor 2 can be placed upon the exterior surface of the gas reservoir 6 under application of a defined pressure. As shown in the drawing the locations where the oscillation transmitter 1 and the oscillation sensor 2 are placed on the exterior surface of the gas reservoir 6 are axially distanced from one another. The oscillation transmitter 1 and the oscillation sensor 2 are arranged in the unit 3 in such a manner that only their oscillation transmitting and oscillation sensing surfaces lie on the exterior surface of the gas reservoir. To this effect these surfaces extend beyond the unit 3.

In this embodiment of the unit 3, the oscillation sensor is arranged for oscillation-decoupling in the unit 3 in a decoupling element 14 acting as a damper. The oscillation transmitter 1 is arranged in a non-damping guide 5 in the unit 3.

Oscillations of various frequencies are generated at the exterior surface of the filled gas reservoir within a particular frequency range, preferably in an acoustic or ultrasonic spectrum. The vibrations pass through the wall of the gas reservoir and through the gas stored in the reservoir. By passing through the frequency range, the resonance frequency is determined and measured. The amplitudes of the vibrations measured by the oscillation sensor have a maximum at the resonance frequency. The measured resonance frequency is compared with a frequency specific for the particular gas reservoir type. This preferably corresponds to the resonance frequency that was determined at the gas reservoir filled with the set gas pressure of the particular gas reservoir type. If the compared resonance frequencies coincide with one another, the airbag gas reservoir exhibits the required inflation pressure. If the measured resonance frequency differs from the resonance frequency of the set pressure beyond a permissible tolerance, this can be indicated by a corresponding signal transmitter or display device. The gas reservoir can in this case be exchanged for a gas reservoir with sufficient inflation pressure.

In addition, a temperature-measuring device 11 in the form of a temperature probe is foreseen. In the shown embodiment, the temperature-measuring device 11 is integrated in the unit 3 designed as a measuring head, and together with the oscillation transmitter 1 and the oscillation sensor 2 is placed upon the exterior surface of the gas reservoir 6. The temperature-measuring device 11 can also, however, be placed on the exterior surface of the gas reservoir as a separate measuring device.

For the evaluation of the measuring signals generated by the oscillation sensor 2 and the temperature-measuring device 11, evaluation electronics 9 are foreseen. These comprise a comparator 7, which is connected to the oscillation sensor 2 via (not further represented) transducers, if necessary. In addition, the evaluation electronics 9 comprise a set value transmitter 8, in which the resonance frequency, which was measured in a gas reservoir 6 filled with a set pressure, is entered in a memory. The evaluation electronics 9 furthermore comprise a temperature compensator 12, which is connected to the set value transmitter 8 and the temperature-measuring device 11.

During the testing of the volume of gas in the gas reservoir 6, the oscillation transmitter 1 generates oscillations at the exterior surface of the gas reservoir 6 with frequencies that change within a particular frequency range. The frequency range is preferably in the acoustic or ultrasonic spectrum. The oscillations generated on the exterior surface of the gas reservoir 6 by the oscillation transmitter 1 are measured by the oscillation sensor. To this effect the oscillation sensor 2 can be designed such that it measures the frequencies of each generated oscillation and determines the resonance amplitude, which is significantly higher than the amplitudes of the other generated frequencies. From the position of the resonance maximum, the resonance frequency can be determined in a known manner. The determining of the resonance frequency can be integrated in the oscillation sensor 2 or a not further represented resonance-determining device can be connected to the oscillation sensor. The thus determined resonance frequency is compared in the comparator 7 with a resonance frequency that was measured in the gas reservoir 6 at the set pressure.

A temperature-induced drift of the resonance frequency can be compensated for in the evaluation electronics 9 with the help of the temperature compensator 12. Due to the temperature measuring by means of the temperature-measuring device 11, the temperature difference between the temperature at which the resonance frequency was determined at the set pressure and the temperature of the gas reservoir 6 during the testing can be established. With the help of the temperature compensator 12, the set value of the resonance frequency is then correspondingly corrected in the set value transmitter 8. In this way a high level of precision is obtained when comparing the measurement of the actual pressure present in the gas reservoir 6 with the set pressure.

If the compared resonance frequencies differ beyond the permissible tolerance, this can be indicated, for instance by means of a signal transmitter 10, which is connected to the evaluation electronics 9, either acoustically, optically or via another display device. If the measured resonance frequency lies within the permissible tolerance, this can also be indicated by another signal transmitter or by the signal transmitter 10, whereby this signal differs from the signal indicating that the measured resonance frequency lies outside the permissible tolerance.

The measured resonance frequency and/or the inflation pressure corresponding to this resonance frequency in the gas reservoir 6 and/or the deviation of the inflation pressure from the set pressure can be indicated by a display device 4, which is connected to the evaluation electronics 9.

It is understood that the invention is not limited to the particular construction and arrangement of parts herein illustrated and described, but embraces such modified forms thereof as come within the scope of the following claims.

We claim:

1. A device for testing the internal pressure of a gas reservoir comprising:

an oscillation transmitter placed on an exterior surface of the gas reservoir;

an oscillation sensor placed on the exterior surface of the gas reservoir;

a temperature-measuring device placed on the exterior surface of the gas reservoir; and evaluation electronics comprising a comparator connected to the oscillation sensor and a set value transmitter that indicates the resonance frequency measured under a set internal pressure, whereby the comparator compares the resonance frequency measured by the oscillation sensor with the resonance frequency indicated by the set value transmitter, the oscillation transmitter, the oscillation sensor, and the temperature-measuring device are integrated in one unit such that the generation and frequency measuring of the oscillations are carried out at locations on the exterior surface of the gas reservoir that are distanced from one another with respect to a longitudinal axis of the gas reservoir, wherein the unit is oscillation-decoupled by the oscillation transmitter and the oscillation sensor.

2. The device for testing the internal pressure of a gas reservoir according to claim 1 further comprising a display device that is connected to the evaluation electronics for indicating at least one of the determined resonance frequency and the inflation pressure in the gas reservoir corresponding to the determined resonance frequency and/or the deviation of the inflation pressure from the set value.

3. The device for testing the internal pressure of a gas reservoir according to claim 1 further comprising a signal transmitter connected to the evaluation electronics for generating a signal when the determined resonance frequency deviates from the set value by exceeding a permissible tolerance and/or a generating a signal, if the determined resonance frequency lies within a permissible tolerance, whereby the two signals differ from each other.

* * * * *